No. 675,723. Patented June 4, 1901.
J. E. FORFAR.
APPARATUS FOR TEACHING MUSICAL SCALE CONSTRUCTION.
(Application filed Oct. 1, 1900.)
(No Model.)
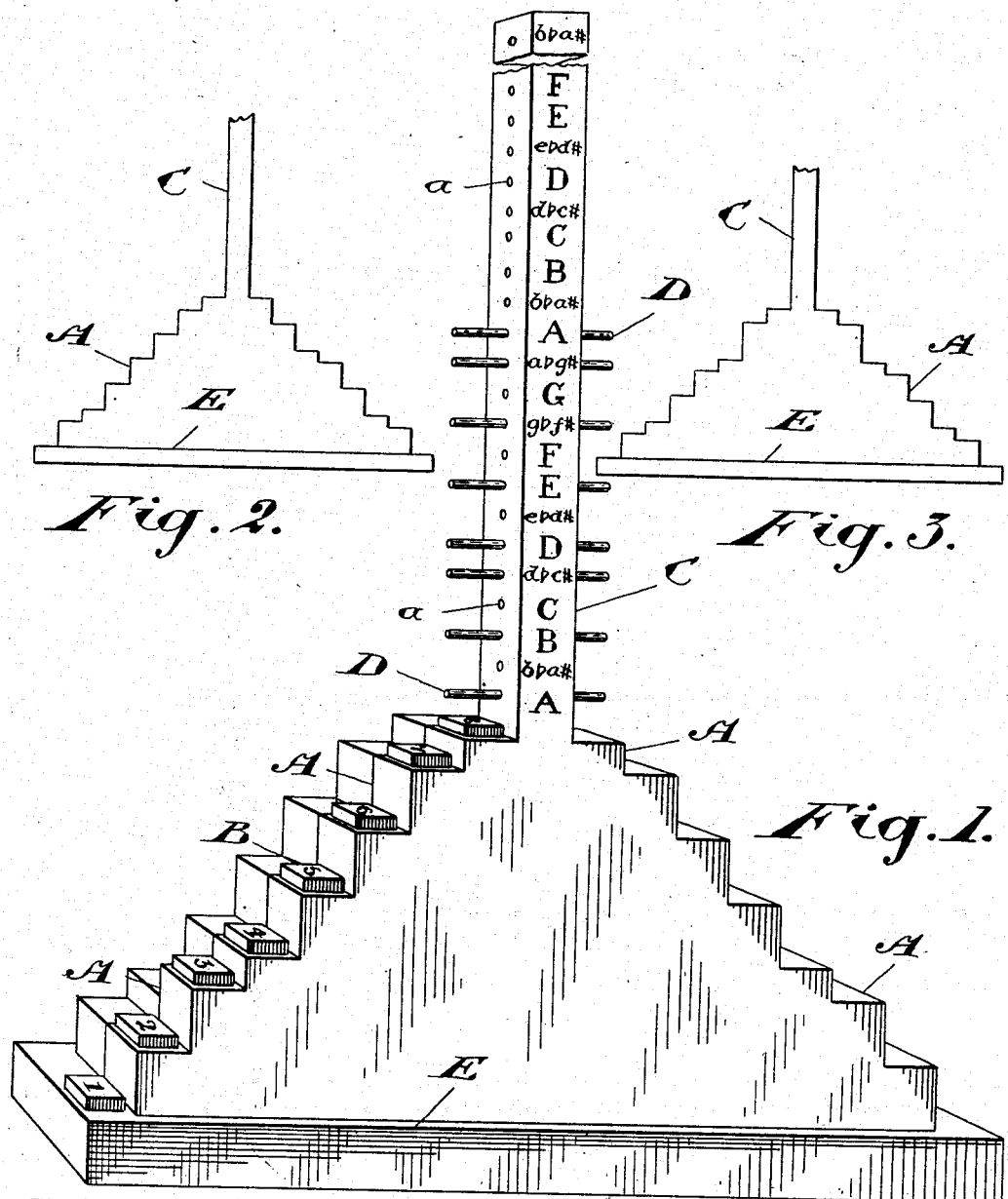

UNITED STATES PATENT OFFICE.

JAMES E. FORFAR, OF TORONTO, CANADA.

APPARATUS FOR TEACHING MUSICAL-SCALE CONSTRUCTION.

SPECIFICATION forming part of Letters Patent No. 675,723, dated June 4, 1901.

Application filed October 1, 1900. Serial No. 31,665. (No model.)

*To all whom it may concern:*

Be it known that I, JAMES E. FORFAR, physician, of the city of Toronto, in the county of York, Province of Ontario, Canada, have invented certain new and useful Improvements in Apparatus for Teaching Musical-Scale Construction, of which the following is a specification.

The object of my invention is to devise apparatus whereby the relative positions of the tones and half-tones in the diatonic scale may be taught through the medium of the eye and by which scales may be visibly built up, taking any note of the chromatic scale as the key-note; and it consists in the peculiar construction, arrangement, and combinations of parts, hereinafter more particularly described and then definitely claimed at the end hereof.

Figure 1 is a perspective view of my apparatus for teaching musical-scale construction. Fig. 2 is an elevation of my invention arranged to teach the melodic minor scale. Fig. 3 is an elevation of my invention arranged to teach the harmonic minor scale.

In the drawings like characters of reference indicate corresponding parts in the different figures.

The apparatus, as shown, consists of a block formed as a series of steps A, to the topmost step being secured a vertical post C. The steps are eight in number, counting the starting-point as one step. As a matter of fact, this step could be dispensed with and the surface of the table on which the apparatus is placed counted as step 1. In the drawings I have preferred to show a base E forming the first step. Above the base the steps are preferably of equal rise, with the exception of the fourth and eighth, which are preferably of half the rise of the others when a major scale is represented. It will be seen that these steps represent to the eye the intervals between the notes of the ordinary diatonic major scale. The rise from the first step to the second represents a whole tone, from the second to the third a whole tone, from the third to the fourth a half-tone, from the fourth to the fifth a whole tone, from the fifth to the sixth a whole tone, from the sixth to the seventh a whole tone, and from the seventh to the eighth a half-tone. Upon these steps may be placed the wooden blocks B to represent the notes of the scale. They may, if desired, be lettered or numbered. As shown, the block is preferably provided with a series of these steps at each side, though, of course, it may also be constructed with steps at one side only.

As far as described, the apparatus can only be used to indicate the intervals between the notes of the diatonic scale, and the insight into scale construction is not complete. The instruction is completed by means of the post C, which has a series of equidistant holes bored into it or through it. Opposite these holes on the post are marked the designations of the half-tones of the chromatic scale, two complete octaves being preferably provided for, so that scales may be constructed with any given note as its key-note. Combined with these holes I use a series of pins or pegs D, which are inserted in the holes at the proper intervals, as suggested to the pupil by the steps A. In the drawings I show the scale of A marked out with the pins D.

I show in Fig. 1 a series of steps representing a minor melodic scale secured on the base E behind the steps representing the major scale.

In Figs. 2 and 3 I show the apparatus as arranged to show the melodic and harmonic minor scales.

The constructions differ only in the positions of the half-steps, and the principle of the invention remains the same.

I find that with this apparatus the construction of the diatonic scales is so forcibly impressed through the medium of the eye that the very youngest pupils quickly learn to build up the scale, starting with any given note as the key-note.

The apparatus might be arranged as a pyramid of steps, if desired, instead of with the flat sides, as shown; but such a construction would naturally fall within the scope of my invention.

What I claim as my invention is—

1. In apparatus for teaching musical-scale construction, a series of steps resembling a flight of steps and representing tones and half-tones, the steps representing half-tones having less rise than those representing whole tones, substantially as and for the purpose specified.

2. In apparatus for teaching musical-scale construction, a series of eight steps resembling a flight of steps and representing tones and half-tones, the rise of the fourth and eighth steps being less than the rise of the other steps, substantially as and for the purpose specified.

3. In apparatus for teaching musical-scale construction, a post having a series of equidistant holes formed in its sides and marked on its face with the designations of the half-tones of the chromatic scale, in combination with a series of pins which may be inserted in the said holes, substantially as and for the purpose specified.

4. In apparatus for teaching musical-scale construction, a series of steps resembling a flight of steps and representing tones and half-tones, the steps representing half-tones having less rise than those representing whole tones, in combination with a post secured to the topmost step and having equidistant holes formed therein marked with the designations of the half-tones of the chromatic scale; and a series of pins which may be inserted in the said holes, substantially as and for the purpose specified.

5. In apparatus for teaching musical-scale construction, a series of eight steps resembling a flight of steps and representing tones and half-tones, the steps representing half-tones having less rise than those representing whole tones, in combination with a similar number of objects which may be placed on the steps, substantially as and for the purpose specified.

6. In apparatus for teaching musical-scale construction, a series of eight steps resembling a flight of steps and representing tones and half-tones, the steps representing half-tones having less rise than those representing whole tones, in combination with a similar number of objects which may be placed on the steps; a post secured to the topmost step and having equidistant holes formed therein marked with the designations of the half-tones of the chromatic scale; and a series of pins which may be inserted in the said holes, substantially as and for the purpose specified.

Toronto, September 21, 1900.

JAMES E. FORFAR.

In presence of—
A. J. COLBOURNE,
J. W. WEBSTER.